(12) United States Patent
Zhang et al.

(10) Patent No.: US 10,696,815 B2
(45) Date of Patent: Jun. 30, 2020

(54) METHODS FOR CHEMICAL DEGRADATION OF EPOXIES USING ORGANIC SALTS AS CATALYSTS

(71) Applicant: WASHINGTON STATE UNIVERSITY, Pullman, WA (US)

(72) Inventors: Jinwen Zhang, Pullman, WA (US); Tuan Liu, Pullman, WA (US); Junna Xin, Pullman, WA (US)

(73) Assignee: WASHINGTON STATE UNIVERSITY, Pullman, WA (US)

( * ) Notice: Subject to any disclaimer, the term of this patent is extended or adjusted under 35 U.S.C. 154(b) by 110 days.

(21) Appl. No.: 16/004,169

(22) Filed: Jun. 8, 2018

(65) Prior Publication Data

US 2018/0355142 A1 Dec. 13, 2018

Related U.S. Application Data

(60) Provisional application No. 62/517,263, filed on Jun. 9, 2017.

(51) Int. Cl.
| | | |
|---|---|---|
| *B29B 9/06* | (2006.01) | |
| *C08J 11/26* | (2006.01) | |
| *C08J 11/16* | (2006.01) | |
| *C08J 11/28* | (2006.01) | |

(52) U.S. Cl.
CPC ............... *C08J 11/26* (2013.01); *C08J 11/16* (2013.01); *C08J 11/28* (2013.01); *C08J 2363/00* (2013.01)

(58) Field of Classification Search
USPC ......................................................... 523/220
See application file for complete search history.

(56) References Cited

U.S. PATENT DOCUMENTS

2003/0098649 A1* 5/2003 Murai ................ C08G 59/1405
313/512

* cited by examiner

*Primary Examiner* — Terressa Boykin
(74) *Attorney, Agent, or Firm* — Johnson, Marcou, Isaacs & Nix, LLC

(57) ABSTRACT

The subject matter disclosed herein is generally directed to methods of recycling epoxy polymers using organic salts as catalysts in an aqueous solution. Epoxy polymers and their composites are widely used in many fields such as coatings, adhesives, wind blades, automobiles, aeronautic vehicles, and sporting goods. However, the management of thermoset composite wastes is becoming a public concern as the out of service thermoset products build up. With the increasing awareness of environmental protection and the depleting of landfill sites, it is of great importance to develop an economically viable and environmentally-friendly recycling technology of thermoset materials that is suitable to industrial scale-up production. As such, there is a clear and present need for a novel solution that is environmentally friendly and scalable in the market.

20 Claims, 4 Drawing Sheets

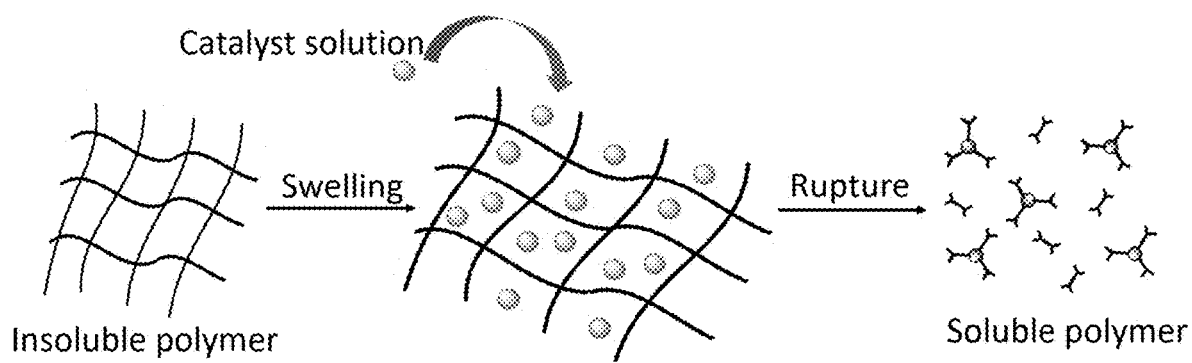
Fig. 1 Schematic process of chemical degradation of epoxy material.

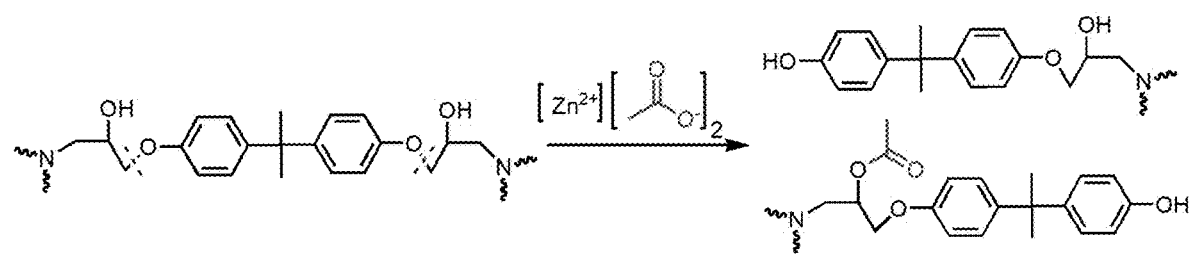
Fig. 2. Possible mechanism of the chemical degradation of epoxy material.

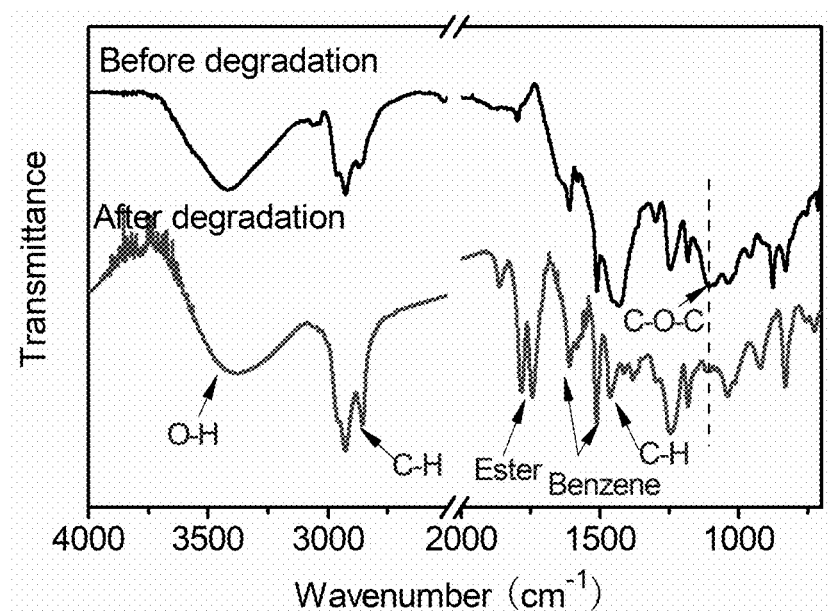
Fig. 3 FTIR spectra of cured epoxy before and after degradation.

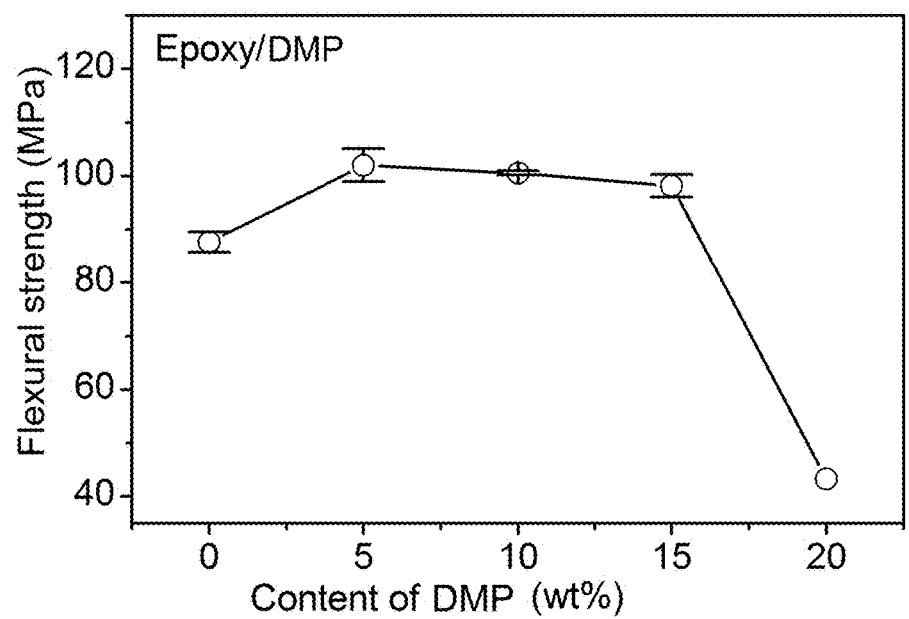
Fig. 4 Flexural strength of new epoxy containing different amounts of decomposed matrix polymer (DMP).

METHODS FOR CHEMICAL DEGRADATION OF EPOXIES USING ORGANIC SALTS AS CATALYSTS

CROSS-REFERENCE TO RELATED APPLICATIONS

This application claims the benefit of U.S. Provisional Application No. 62/517,263, filed Jun. 9, 2017. The entire contents of the above-identified applications are hereby fully incorporated herein by reference.

TECHNICAL FIELD

The subject matter disclosed herein is generally directed to recycling of thermosetting polymers using organic salts as catalysts.

BACKGROUND

There is a growing interest in recycling thermosetting polymer materials including fiber reinforced thermoset composites. It is of great economic and environmental value to utilize the residual fiber and thermosetting polymers from the used products and manufacturing scraps, instead of disposing them in a landfill. However, recycling of thermosetting polymer materials is difficult because the polymers in such materials are permanently cross-linked.

Early chemical degradation studies were focused on the degradation of the thermosetting polymer using strong acid or strong alkali aqueous solutions. Use of these harsh chemicals easily causes corrosion to equipment and can potentially result in pollution to the environment. Additionally, the harsh chemical solution could turn the thermosetting polymer into a complex mixture which can become a secondary waste.

Thus, there is a need for novel processes for the chemical degradation of thermosetting polymers and fiber reinforced polymers into soluble oligomers and fibers that can be reused in new resin systems.

SUMMARY

In certain example embodiments, the invention provides for methods of recycling thermosetting polymers using organic salts as catalysts in aqueous solution.

In one aspect, the present invention provides for a method for degradation of thermosetting polymers in a chemical reaction via cleaving chemical bonds in a polymer using a reaction medium comprising one or more organic salts as a catalyst in an aqueous solution. The polymer may comprise a pure epoxy polymer. In certain applications, the polymer is a coating or adhesive. The polymer may comprise a fiber reinforced epoxy. The fiber reinforced epoxy may comprise glass or carbon fibers.

In certain embodiments, the method may further comprise reducing the polymer to particles or fragments before the chemical reaction, such as by chopping, slicing, shredding, crushing, pulverizing, or any combination thereof. In certain embodiments, making the polymer size smaller allows improved diffusion of the solvent into the polymer.

In certain embodiments, the method may further comprise heating the reaction to a reaction temperature above the glass transition ($T_g$) temperature of the polymer. This is because swelling of the polymer with the aqueous solution only take place above the $T_g$ of the polymer. The reaction temperature may be about 100 to 270° C., preferably, about 150 to 250° C.

In certain embodiments, the reaction time is about 1 to 15 hours, preferably about 3 to 6 hours. In certain embodiments, the reaction pressure is about 0.5 to 4 MPa.

In certain embodiments, the organic salt comprises an anion and cation, wherein the cation is selected from the group consisting of $Zn^{2+}$, $Fe^{3+}$, $Fe^{2+}$, $Cu^{2+}$, $Cu^{+}$, $Cr^{3+}$, $Cr^{2+}$, $Mn^{2+}$, $Mn^{3+}$, $CO^{3+}$, $Ni^{2+}$, $Ni^{3+}$, $Sn^{2+}$, $Sn^{4+}$, $Pb^{2+}$, and $Pb^{4+}$ ions, and wherein the anion is selected from the group consisting of acetate ($CH_3COO$—), formate ($HCOO$—), propionate ($C_2H_5COO$—), octoate, ethanedioate ($[C_2O_4]^{2-}$), and organic sulphonic acid ions. Typically, the organic salts are zinc acetate ($Zn(O_2CCH_3)_2$) and tin(II) 2-ethylhexanoate or tin(II) octanoate or stannous octoate (Sn $(Oct)_2$).

In certain embodiments, the polymer comprises amine-cured epoxies or anhydride-cured epoxies.

In certain embodiments, the weight fraction of catalyst in the aqueous solution of the solvent is about 3 to 30 wt %, preferably about 5 to 10 wt %. In certain embodiments, the weight fraction of polymer in the solvent is about 5 to 80 wt %, preferably about 30 to 50 wt %.

In certain embodiments, the method may further comprise recovering decomposed matrix polymer (DMP) from the reaction. In certain embodiments, the method may further comprise recovering decomposed matrix polymer (DMP) and fiber from the reaction. In certain embodiments, the method may further comprise using the recovered DMP as a curing agent in the preparation of cured epoxy or in the preparation of polyurethane.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

FIG. 1—illustrates a schematic process of chemical degradation of a thermosetting polymer.

FIG. 2—illustrates a possible mechanism of chemical degradation of epoxy material.

FIG. 3—illustrate FTIR spectra of cured epoxy before and after degradation.

FIG. 4—illustrate flexural strength of new epoxy containing different amounts of decomposed matrix polymer (DMP).

The figures herein are for illustrative purposes only and are not necessarily drawn to scale.

DETAILED DESCRIPTION OF THE EXAMPLE EMBODIMENTS

General Definitions

As used herein, the singular forms "a", "an", and "the" include both singular and plural referents unless the context clearly dictates otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of +/−10% or less, +1-5% or less, +/−1% or less, and +/−0.1% or less of and from the specified value, insofar such variations are appropriate to perform in the disclosed invention. It is to be understood that the value to which the modifier "about" or "approximately" refers is itself also specifically, and preferably, disclosed.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment but may. Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention. For example, in the appended claims, any of the claimed embodiments can be used in any combination.

All publications, published patent documents, and patent applications cited herein are hereby incorporated by reference to the same extent as though each individual publication, published patent document, or patent application was specifically and individually indicated as being incorporated by reference.

Overview

Embodiments disclosed herein provide a favorable means for recycling thermosetting polymers. The present invention provides a framework for the chemical degradation of thermosetting polymers using an organic salt as a catalyst in aqueous solvents. As used herein, "degradation" and "decompose" are used interchangeably. First, the cross-linked polymer is swelled in liquid solution (solvent), and the catalyst permeates into the cross-linked network; and second, chemical bonds are cleaved under the effect of catalysts. The decomposed matrix polymer (DMP) can be recovered. In certain embodiments, the polymer is a fiber reinforced thermoset, and decomposed matrix polymer (DMP) and fiber can be recovered. The fiber can be separated from the DMP as described further herein. The key technical point for the disclosed methods is an efficient catalyst system that is capable of permeating into the cured resins and breaking down the chemical bonds of the thermosetting polymer in a controlled manner. The methods of the present invention allow for the polymers to be broken down into oligomers as opposed to monomers and unusable secondary waste. Furthermore, the methods of the present invention do not result in pollution to the environment and do not cause corrosion to equipment.

Recently, recycling of thermosetting polymers, including epoxies, by the chemical degradation of the polymer was introduced in a few reports (see, e.g., Wang et al., Controllable degradation of polyurethane elastomer via selective cleavage of CO and CN bonds. Journal of Cleaner Production, Vol 176, 2018, Pages 873-879; Kuang et al., Dissolution of epoxy thermosets via mild alcoholysis: the mechanism and kinetics study. RSC Adv., 2018, 8, 1493-1502; Liu et al., Selective cleavage of ester linkages of anhydride-cured epoxy using a benign method and reuse of the decomposed polymer in new epoxy preparation. Green Chem., 2017, 19, 4364-4372; Jiang et al., On the successful chemical recycling of carbon fiber/epoxy resin composites under the mild condition. Composites Science and Technology, Vol 151, 2017, Pages 243-251; Wang et al., Chemical Recycling of Carbon Fiber Reinforced Epoxy Resin Composites via Selective Cleavage of the Carbon-Nitrogen Bond. ACS Sustainable Chem. Eng., 2015, 3 (12), pp 3332-3337; Wang, et al., Chemical recycling of unsaturated polyester resin and its composites via selective cleavage of the ester bond. Green Chem., 2015, 17, 4527-4532; and Deng et al., Cleavage of C—N bonds in carbon fiber/epoxy resin composites. Green Chem., 2015, 17, 2141-2145). In these studies, inorganic salts, such as $ZnCl_2$ and $AlCl_3$, were used as the catalysts in the cleavages of the covalent bonds of the polymers. According to Deng et al., it is impossible for large-sized metal complexes and solid catalysts to diffuse into thermoset epoxy resin (EP) to interact with its C—N bonds, and small-sized Lewis acid centres are required to coordinate with the N atom of C—N bonds in EP. The mild reaction temperature and high degradation efficiency make inorganic salts promising methods for the recycling of epoxies and other thermosetting polymers. However, inorganic salts contain highly corrosive anions (i.e. Cl—, $NO_2^-$, and $SO_4^{2-}$) which can cause corrosion to processing equipment. More seriously, these corrosive anions cannot be totally removed from the decomposed polymers during post-treatment procedures. When it comes to reuse of the decomposed polymers, the residue corrosive anions could greatly restrict the application to new polymers.

The present invention discloses that a series of organic salts are effective as catalysts for chemical degradation of epoxies and for recycling of fiber reinforced epoxies (both glass and carbon fibers). Compared with inorganic salts that contain highly corrosive anions, organic salts are low corrosive and exhibit adequate degradation efficiency for the degradation of epoxies. It was also unexpectedly found that the low corrosive anions in organic salts can improve the swelling of the epoxy in water, which facilitates the permeation of cations into the thermosetting polymer and eventually breaks down the chemical bonds of the polymer. This is because the organic salt can exist in an intermediate state of organic acid and metal ion complex in protic solvents (i.e. water and ethanol).

Prior methods of degrading polymers included solvolysis, a supercritical method, and pyrolysis. (see, e.g., Oliveux et al., Degradation of a model epoxy resin by solvolysis routes. Polymer Degradation and Stability, Vol 118, 2015, 96-103). In pyrolysis, for example, composite materials are heated up to 450-600° C. in the absence or presence of oxygen, producing oil, gases and chars that can lead to contamination of the remaining solid fractions. Compared with the supercritical method and pyrolysis, the catalytic chemical degradation method of the present invention may selectively decompose thermosetting resin under mild reaction conditions (<200° C.) to break specific chemical bonds (i.e. ester or an ether bond), whereby degraded resin is soluble and processable. When the degraded resin is added in a new resin system as a reactive ingredient, the resulting cured material maintains excellent mechanical properties.

Polymers

In one aspect, the present invention provides for a method for degradation of thermosetting polymers (e.g., resins). Thermosets are infusible (i.e. incapable of being melted) and insoluble (i.e. cannot be dissolved in a solvent) polymer networks prepared by curing. Curing refers to the hardening of a polymer material by the cross-linking of polymer chains. "Cross-linking" is the process of bonding one polymer chain to another. Curing the resin generally means to apply energy to the polymer material, most commonly by increasing the temperature to a predetermined temperature. Usually, a thermosetting resin system is manufactured by mixing the components: monomer and/or precursor, hardener, catalyst and additives, introducing into a mold and increasing the temperature. Thermosetting resin precursor as used herein refers to an oligomer, a prepolymer, polymer or macromolecule. When a precursor is reacted with a hardener in the presence of a source of energy, particularly heat, and optionally a small amount of catalyst, the reaction yields a polymer network with a solid structure. The means for making such a subject are well known in the art.

Prior to curing, thermoset resins are typically liquid, and exist as a reactive mixture of monomers and oligomers. This reactive mixture is introduced into a mold where it is cross-linked to create a rigid, three-dimensional network of oligomer chains with a desired shape or form. Thermosets, particularly epoxies, are molded and crosslinked at elevated temperature or at room temperature.

Thermosetting polymers according to the present invention include, but are not limited to polyepoxides (epoxy resins), unsaturated polyesters, phenolic resins, polyurethanes, acrylic resins, polyimide resins, amino resins, melamine resins, urea resins. In addition, two or more of the polymers may be mixed.

The precursor of usable thermosetting resin in the present invention may in particular be selected from: epoxy novolac resins, bisphenol A diglycidyl ether (DGEBA), bisphenol F diglycidyl ether, tetraglycidyl methylene dianiline, pentaerythritol tetraglycidyl ether, bisphenol tetrabromo A diglycidyl ether, hydroquinone diglycidyl ether or, ethylene glycol diglycidyl ether, propylene glycol diglycidyl ether, butylene glycol diglycidyl ether, diglycidyl ether neopentyl glycol, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, diglycidyl ether polytetramethylene glycol, resorcinol diglycidyl ether, neopentyl glycol diglycidyl ether, bisphenol A polyethylene glycol diglycidyl ether, bisphenol A polypropylene glycol diglycidyl ether, the diglycidyl ester of terephthalic acid, polyunsaturated epoxidized fatty acids, epoxidized vegetable oils, epoxidized fish oils, and epoxidized limonene and mixtures thereof.

According to the invention, the term "epoxy resin" or "epoxies" is meant any substance monomer, oligomer or mixture of oligomers consisting of epoxide functional groups as the basic components (also called a glycidyl or oxirane group). Epoxy resin may also refer to the reaction product or the cured end products of an epoxy resin with one or more hardeners or curing agents. A curing agent is required to form a crosslinked three-dimensional network from an epoxy resin. There are a wide variety of curing agents for epoxy resins. Agents commonly used to crosslink the epoxides are amines, polyamides, anhydrides, carboxylic acids, polycarboxylic acids, phenols, thiols, isocyanates and polymercaptans (e.g., amine-cured epoxies or anhydride-cured epoxies).

The kinetics of the curing reaction and the glass transition temperature ($T_g$) of the crosslinked resin depends on the nature of the hardener. The glass-liquid transition or glass transition refers to the reversible transition in amorphous materials (or in amorphous regions within semicrystalline materials) from a hard and relatively brittle "glassy" state into a viscous or rubbery state as the temperature is increased. The glass-transition temperature $T_g$ of a material characterizes the range of temperatures over which this glass transition occurs. It is always lower than the melting temperature, $T_m$, of the crystalline state of the material if exists. The choice of resin and hardener essentially depends on the application and desired properties. The stoichiometry of the epoxy-hardener system also affects the properties of the cured material. Thus, in certain embodiments, different polymers according to the present invention have a different glass transition temperature ($T_g$). As described further herein, swelling of a resin in a liquid solution. Differential scanning calorimetry (DSC) and Dynamic mechanical analysis (DMA) instruments can be used to determine the $T_g$ of a polymer.

In certain embodiments, the thermosetting polymer comprises a reinforcing fiber including, but not limited to glass fiber, carbon fiber, aramid fiber, basalt fiber and vegetable fiber or fiber of vegetable origin, preferably a glass fiber or carbon fiber.

In certain embodiments, a composite material with a thermosetting polymer subjected to the recycling process of the present invention comprises from 25% to 80% by weight of thermosetting resin (for example, epoxy) and from 20% to 75% by weight of reinforcing fiber, preferably from 50% to 70% by weight of reinforcing fiber (for example, glass fibers).

The thermosetting polymers of the present invention may be derived from materials and composites for automotive, aircraft manufacture, electronics, sports, construction, printing or packaging. The composite material with a thermosetting polymer subjected to recycling in the present invention can be an industrial processing waste material, e.g. scraps, nonconforming parts, defective parts, sprues, discharges; or else they can be an end-of-life product, e.g. car doors, truck bumpers, isothermal trailers, electric insulators, electrical cabinets, ducts, pultruded beams, industrial roofing, tanks, grills, profiles, boat hulls, molds for boat hulls, bushings, tubes, fishing rods, aeronautic and aerospace components and wind turbine blades.

Thermosetting resin recycled by the method of the present invention, can include cured resin alone, an uncured resin, a varnish containing a resin, glass fibers, fillers, glass cloth, wood powder or the like, paper, cloth laminate with a substrate, a copper foil and metal-clad laminate formed by laminating a metal foil, or molded articles. Thermosetting resin products such as printed circuit boards obtained by processing the copper-clad laminate can also be recycled according to the present invention.

The term "recycle" as used herein refers to the common usage of the term, and includes the act of reprocessing a material, or a product of a re-processed material, for re-use in subsequent applications, either as a final product or an intermediate product.

Degrading Polymers into Reusable Units

It is an objective of the present invention to develop a method of degrading a thermosetting resin using conditions capable of swelling and effectively breaking the internal chemical bonds of the catalytic system, such that the degraded subunits can be recycled. In certain embodiments, a polymer is degraded into units that can be recycled to be used in generating new polymer systems. In certain embodiments, the polymer is degraded in a chemical reaction. The process can be as described in FIG. 1. The polymer is swelled in a solvent that includes a catalyst wherein chemical bonds are broken leaving oligomers.

In certain embodiments, the polymer is decomposed into low-middle molecular weight compounds containing, as a main body, oligomers of a molecular weight of 200-10,000 g/mol.

In certain embodiments, the solvent is an aqueous solvent. In certain embodiments, the solvent is aqueous solution comprising water and a catalyst. In certain embodiments, the invention is inclusive of organic solvents, including a catalyst and primary and secondary alkanols, mono- and poly-alkoxyalkanols, alkenols, and cycloaliphatic solvents which can have a carbon atom content within the range of 1 to 18. Illustrative of alkanols are n-butyl alcohol, sec-butyl alcohol, pentyl alcohol, 1-hexanol, 2-hexanol, octanol-2, octanol-1, nonyl alcohol, decanol-1, decanol-3, undecyl alcohol, dodecyl alcohol, pentadecyl alcohol, hexadecyl alcohol, octadecyl alcohol, and the like. Illustrative of mono- and poly-alkoxyalkanols are the ethyl, butyl, hexyl, octyl, decyl, and like alkyl monoethers of ethylene glycol, 1,3-propylene glycol, 1,4-butanediol, 1,2-hexanediol, diethylene glycol, dipropylene glycol, tripropylene glycol, and the like. Illustrative of cycloaliphatic alcohols are cyclobutanol, cyclopentanol, cyclohexanol, cycloheptanol, 1-methylcyclohexan-2-ol, and the like.

In certain embodiments, swelling of the polymer by a solvent requires the polymer to be in a more viscous or rubbery state as a brittle state will not allow efficient permeation of the polymer by the solvent. For example, water cannot effectively permeate into the cross-linked network below the $T_g$ of a sample. In certain embodiments, epoxies possess high crosslink density and stable chemical structures which renders a barrier to water. Only when the reaction temperature reaches the $T_g$ can the chain segments have adequate mobility to allow the water/catalyst system to effectively permeate into the sample and cleave some of the chemical bonds of the polymer. Thus, in certain embodiments, the swelling of the polymer with the solvent takes place above the glass transition temperature of the polymer ($T_g$).

In certain embodiments, the catalyst is an organic salt. In certain embodiments, the weight fraction of catalyst in the aqueous solution is about 3 to 30 wt %, preferably about 5 to 10 wt %. In certain embodiments, the weight fraction of polymer in the aqueous solution is about 5 to 80 wt %, preferably about 30 to 50 wt %. In certain embodiments, the solvent is generated by dissolving the catalyst in the solvent (e.g., dissolve the organic catalyst in water).

In certain embodiments, the organic salt comprises an anion and cation, wherein the cation is selected from the group consisting of $Zn^{2+}$, $Fe^{3+}$, $Fe^{2+}$, $Cu^{2+}$, $Cu^{+}$, $Cr^{3+}$, $Cr^{2+}$, $Mn^{2+}$, $Mn^{3+}$, $CO^{3+}$, $Ni^{2+}$, $Ni^{3+}$, $Sn^{2+}$, $Sn^{4+}$, $Pb^{2+}$, and $Pb^{4+}$ ions, and wherein the anion is selected from the group consisting of acetate ($CH_3COO-$), formate ($HCOO-$), propionate ($C_2H_5COO-$), octoate, ethanedioate ($[C_2O_4]^{2-}$), and organic sulphonic acid ions.

In certain embodiments, epoxies cured with different hardeners have different properties, such that degradation of the epoxies is more efficiently carried out using different organic salts as catalysts, as described further herein. For example, amine-cured epoxies may be efficiently degraded using zinc acetate ($Zn(O_2CCH_3)_2$) as the organic salt catalyst. Additionally, anhydride-cured epoxies may be efficiently degraded using stannous octoate ($Sn(Oct)_2$) as the organic salt catalyst.

In certain embodiments, the method may further comprise heating the reaction to a reaction temperature above the glass transition ($T_g$) temperature of the polymer (e.g., to allow swelling and for the chemical bonds to be broken) and below the temperature wherein the polymer burns (e.g., generates chars), wherein swelling of the polymer with the solvent takes place. The reaction temperature may be about 100 to 270° C., preferably, about 150 to 250° C.

In certain embodiments, the reaction is heated to allow the reaction kinetics to proceed in a reasonable amount of time. In certain embodiments, the reaction time is about 1 to 15 hours, preferably about 3 to 6 hours.

In certain embodiments, a polymer matrix is reduced in size to allow improved diffusion or permeation of the solvent into the polymer. In certain embodiments, a polymer may be reduced to particles or fragments by chopping, slicing, shredding, crushing, pulverizing, or any combination thereof. In certain embodiments, a polymer matrix may be reduced to particles or fragments by applying a mechanical grinding. Particle sizes can be chosen so as to affect subsequent processing steps, such as heating or swelling, the duration and ease of which partially depend on particle size.

In certain embodiments, the reaction is performed in a pressure reactor. In certain embodiments, the aqueous solution and polymer is directly added into the pressure reactor. The temperature of the pressure reactor may be raised to a predetermined temperature (e.g., about 100 to 250° C.). In certain embodiments, the reactor is cooled after completion of the reaction. Methods of cooling are known in the art. In one embodiment, the reactor is cooled in a water bath. A pressure reactor, sometimes referred to as a pressure tube, or a sealed tube, is a chemical reaction vessel which can conduct a reaction under pressure. The pressure is caused by the reaction itself. A pressure reactor can conduct a reaction above the boiling point of a solvent (e.g., water) and accelerate a reaction. Increase in temperature can speed up the desired reaction, but also speed up the decomposition of reagents and starting materials. The increase of reaction temperature leads to the increase of pressure. In certain embodiments, the reaction pressure for degrading polymers is about 0.5 to 4 MPa.

In certain embodiments, the method may further comprise recovering decomposed matrix polymer (DMP) from the reaction. DMP may be recovered by filtering the reaction mixture. In certain embodiments, the solvent can be reused for subsequent reactions. The aqueous solution that comprises catalyst may be reused 1, 2, 3, 4, 5, or more than 10 times. The DMP recovered via filtration can be dried into a powder and stored for reuse. In certain embodiments, the method may further comprise recovering decomposed matrix polymer (DMP) and fiber from the reaction. DMP and fibers can be recovered by filtration. The DMP may be dissolved to separate DMP from the fibers. The DMP may be dissolved in an organic solvent. The organic solvent may be acetone. The insoluble fiber may be recovered by further filtration. The fiber may be washed and dried. The dissolved DMP may be recovered by evaporation of the organic solvent (e.g., acetone). The dissolved DMP may be concentrated using a rotary evaporator. The dissolved DMP may be recovered by drying the DMP (e.g., in a vacuum oven).

Reusing Degraded Polymer Units

In certain embodiments, the method may further comprise using the recovered DMP as a curing agent in the preparation of cured epoxy or in the preparation of polyurethane. In certain embodiments, the recycling method comprises reusing, as a raw material of the thermosetting resin, the recovered low-middle molecular weight compounds containing, as the main body, the oligomers having a molecular weight of 200-10,000 g/mol.

Formulations for new epoxy curing systems may include 5, 10, 20, 30, 40, or 50% DMP and 95, 90, 80, 70, 60, or 50% neat polymer precursor (e.g., epoxy). In certain embodiments, recycled DMP is mixed with neat epoxy resin (e.g., DER 331). In certain embodiments, the epoxy mixture is heated to facilitate mixing. In certain embodiments, the epoxy mixture is heated at about 100° C. for mixing. The homogenous mixture may then be cooled (e.g., 70° C.) under continuous stirring. An accelerator may be added (e.g., diethyl methyl imidazole, tertiary amines, carboxylic acids, phenols, and alcohols), followed by curing.

Analysis of Polymers and Degraded Polymer Units

In certain embodiments, the polymer is analyzed before recycling. In certain embodiments, the degraded polymer units are analyzed after performing the methods of the present invention (e.g., oligomers, fibers). In certain embodiments, new polymer compositions incorporating recycled polymer units are analyzed. Methods of analyzing the polymer compositions and polymer degraded units are well known in the art. For example, analysis may be performed using Fourier transform infrared (FT-IR) analysis of the samples (e.g., using a spectrophotometer in the range from 400 to 4000 $cm^{-1}$). Analysis may also be performed using solid-state NMR spectra (e.g., using a spectrometer operating at 600 MHz). Analysis may also be performed using $^{13}$C-NMR spectra of products (e.g., using a spectrometer operating at 400 MHz). Elemental analysis may also be carried out using an elemental analyzer (e.g., a thermo iCAP6300 inductively coupled plasma emission spectrometer (ICP) can be used to determine the content of various elements in the samples). Contaminating elements may be identified (e.g., from the polymer or catalyst system). The number average molecular weights ($M_n$), weight average molecular weight (Mw) and polydispersities (PDI) can also be measured. Analysis may also be performed using a scanning electron microscope (SEM) to observe the morphology of virgin fibers and recycled fibers.

The invention is further described in the following examples, which do not limit the scope of the invention described in the claims.

EXAMPLES

Example 1—Example of Chemical Degradation of Amine-Cured Epoxy Using a Zinc Acetate Aqueous Catalyst System The degradation reaction was carried out in a pressure reactor. 5 g zinc acetate was dissolved in 20.0 g water. The obtained solution and 4.0 g amine-cured epoxy were directly added into the pressure reactor. The temperature of reactor was raised to a predetermined temperature of 200° C. and reacted for 5 hours. After the reaction, the reactor was cooled in a water bath. The reaction mixture was filtered. The liquid catalyst solution could be directly reused for the next reaction. The solid was decomposed matrix polymer (DMP). Subsequently, the DMP was dried in vacuum oven at 80° C. for 8 h, yielding a yellow solid powder.

Example 2—Example of Chemical Degradation of Amine-Cured Epoxy Using a Stannous Octoate Aqueous Catalyst System The degradation reaction was carried out in a pressure reactor. 5 g stannous octoate was dissolved in 20.0 g water. The obtained solution and 4.0 g amine-cured epoxy were directly added into the pressure reactor. The temperature of reactor was raised to a predetermined temperature of 220° C. and reacted for 5 hours. After the reaction, the reactor was cooled in a water bath. The reaction mixture was filtered. The liquid catalyst solution could be directly reused for the next reaction. The solid was DMP. Subsequently, the DMP was dried in a vacuum oven at 80° C. for 8 h, yielding a yellow solid powder.

Example 3—Example of Chemical Degradation of Anhydride-Cured Epoxy Using a Ferrous Acetate ($Fe(OOCCH_3)_2$) Aqueous Catalyst System The degradation reaction was carried out in a pressure reactor. 5 g ferrous acetate was dissolved in 20.0 g water. The obtained solution and 4.0 g anhydride-cured epoxy were directly added into the pressure reactor. The temperature of reactor was raised to a predetermined temperature of 180° C. and reacted for 5 hours. After the reaction, the reactor was cooled in a water bath. The reaction mixture was filtered. The liquid catalyst solution could be directly reused for the next reaction. The solid was DMP. Subsequently, the DMP was dried in vacuum oven at 80° C. for 8 h, yielding a yellow solid powder.

Example 4—Example of Chemical Degradation of Glass Fiber Reinforced Epoxy Composite Using a Zinc Acetate Aqueous Catalyst System The degradation reaction was carried out in a pressure reactor. 5 g zinc acetate was dissolved in 20.0 g water. The obtained solution and 4.0 g epoxy composite were directly added into the pressure reactor. The temperature of reactor was raised to a predetermined temperature of 230° C. and reacted for 5 hours. After the reaction, the reactor was cooled in a water bath. The reaction mixture was filtered. The liquid catalyst solution could be directly reused for the next reaction. The solid was DMP and glass fiber. Acetone was used to dissolve the DMP. The insoluble glass fiber was collected through filtration. The DMP acetone solution was concentrated using a rotary evaporator and dried in vacuum oven. The collected DMP appeared as a yellow solid powder.

Example 5—Example of Chemical Degradation Carbon Fiber Reinforced Epoxy Composite Using a Zinc Acetate Aqueous Catalyst System The degradation reaction was carried out in a pressure reactor. 5 g zinc acetate was dissolved in 20.0 g water. The obtained solution and 5.0 g epoxy composite were directly added into the pressure reactor. The temperature of reactor was raised to a predetermined temperature of 230° C. and reacted for 5 hours. After the reaction, the reactor was cooled in a water bath. The reaction mixture was filtered. The liquid catalyst solution could be directly reused for the next reaction. The solid was DMP and carbon fiber. Acetone was used to dissolve the DMP. The insoluble carbon fiber was collected through filtration. The DMP acetone solution was concentrated using a rotary evaporator and dried in vacuum oven. The collected DMP appeared as a yellow solid powder.

Example 6—Example of the Application Development of Decomposed Matrix Polymers

Under magnetic stirring, the DMP was mixed with epoxy resin (DER 331) at 100° C. After a homogeneous mixture was obtained, nadic methyl anhydride, the curing agent, was added under continuous stirring at 80° C. Then, diethyl methyl imidazole, the accelerator, was added. After a homogeneous mixture was formed, it was degassed and cured in a metal mold. the curing was a three-step process: 100° C. for 2 hours, 150° C. for 3 hours, and 180° C. for 2 hours. After curing, the sample was allowed to cool down naturally to room temperature. The obtained cured product exhibited similar mechanical and thermal properties as the neat totally fresh epoxy.

The invention is further described by the following numbered paragraphs:

1. A method for degradation of thermosetting polymers in a chemical reaction comprising cleaving chemical bonds in a polymer using one or more organic salts as a catalyst in an aqueous solution.
2. The method of paragraph 1, wherein the polymer comprises a pure epoxy polymer.
3. The method of paragraph 1, wherein the polymer comprises a fiber reinforced epoxy.
4. The method of paragraph 3, wherein the fiber reinforced epoxy comprises glass or carbon fibers.
5. The method of paragraph 1, wherein the polymer is a coating or adhesive.
6. The method of paragraph 1, further comprising reducing the polymer to particles or fragments before cleaving chemical bonds, such as by chopping, slicing, shredding, crushing, pulverizing, or any combination thereof
7. The method of paragraph 1, further comprising heating the reaction to a reaction temperature above the glass transition ($T_g$) temperature of the polymer and below the temperature wherein the polymer burns, wherein swelling of the polymer with the solvent takes place.
8. The method of paragraph 7, wherein the reaction temperature is about 100 to 270° C., preferably, about 150 to 250° C.
9. The method of paragraph 1, wherein the reaction time is about 1 to 15 hours, preferably about 3 to 6 hours.
10. The method of paragraph 1, wherein the organic salt comprises an anion and cation,
    wherein the cation is selected from the group consisting of $Zn^{2+}$, $Fe^{3+}$, $Fe^{2+}$, $Cu^{2+}$, $Cu^+$, $Cr^{3+}$, $Cr^{2+}$, $Mn^{2+}$, $Mn^{3+}$, $Co^{3+}$, $Ni^{2+}$, $Ni^{3+}$, $Sn^{2+}$, $Sn^{4+}$, $Pb^{2+}$, and $Pb^{4+}$ ions, and
    wherein the anion is selected from the group consisting of acetate ($CH_3COO$—), formate ($HCOO$—), propionate ($C_2H_5COO$—), octoate, ethanedioate ($[C_2O_4]^{2-}$), and organic sulphonic acid ions.
11. The method of paragraph 1, wherein the thermosetting polymer comprises amine-cured epoxies or anhydride-cured epoxies.
12. The method of paragraph 1, wherein the weight fraction of catalyst in the aqueous solution of the solvent is about 3 to 30 wt %, preferably about 5 to 10 wt %.
13. The method of paragraph 1, wherein the weight fraction of thermosetting polymer in the solvent is about 5 to 50 wt %, preferably about 10 to 30 wt %.
14. The method of paragraph 1, further comprising recovering decomposed matrix polymer (DMP) from the reaction.
15. The method of paragraph 1, further comprising recovering decomposed matrix polymer (DMP) and fiber from the reaction.
16. The methods of paragraphs 14 or 15, further comprising using the recovered DMP as a curing agent in the preparation of cured epoxy or in the preparation of polyurethane.
17. The method of paragraph 1, wherein reaction pressure is about 0.5 to 4 MPa.

Various modifications and variations of the described methods of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before setting forth.

What is claimed is:

1. A method for degradation of epoxy polymers in a chemical reaction comprising cleaving chemical bonds in a polymer using a solvent comprising one or more organic salts as a catalyst in an aqueous solution.
2. The method of claim 1, wherein the polymer comprises a pure epoxy polymer.
3. The method of claim 1, wherein the polymer comprises a fiber reinforced epoxy.
4. The method of claim 3, wherein the fiber reinforced epoxy comprises glass or carbon fibers.
5. The method of claim 1, wherein the polymer is a coating or adhesive.
6. The method of claim 1, further comprising reducing the polymer to particles or fragments before cleaving chemical bonds, such as by chopping, slicing, shredding, crushing, pulverizing, or any combination thereof.
7. The method of claim 1, further comprising heating the reaction to a reaction temperature above the glass transition ($T_g$) temperature of the polymer and below the temperature wherein the polymer burns, wherein swelling of the polymer with the solvent takes place.
8. The method of claim 7, wherein the reaction temperature is about 100 to 270° C.
9. The method of claim 7, wherein the reaction temperature is about 150 to 250° C.
10. The method of claim 1, wherein the reaction time is about 1 to 15 hours.
11. The method of claim 1, wherein the reaction time is about 3 to 6 hours.
12. The method of claim 1, wherein the organic salt comprises an anion and cation,
    wherein the cation is selected from the group consisting of $Zn^{2+}$, $Fe^{3+}$, $Fe^{2+}$, $Cu^{2+}$, $Cu^+$, $Cr^{3+}$, $Cr^{2+}$, $Mn^{2+}$, $Mn^{3+}$, $Ni^{3+}$, $Sn^{2+}$, $Sn^{4+}$, $Pb^{2+}$, and $Pb^{4+}$ ions, and wherein the anion is selected from the group consisting of acetate ($CH_3COO-$), formate ($HCOO-$), propionate ($C_2H_5COO-$), octoate, ethanedioate ($[C_2O_4]^{2-}$), and organic sulphonic acid ions.

13. The method of claim 1, wherein the polymer comprises amine-cured epoxies or anhydride-cured epoxies.

14. The method of claim 1, wherein the weight fraction of catalyst in the aqueous solution of the solvent is about 3 to 30 wt %.

15. The method of claim 1, wherein the weight fraction of polymer in the solvent is about 5 to 80 wt %.

16. The method of claim 1, further comprising recovering decomposed matrix polymer (DMP) from the reaction.

17. The method of claim 3, further comprising recovering decomposed matrix polymer (DMP) and fiber from the reaction.

18. The method of claim 16, further comprising using the recovered DMP as a curing agent in the preparation of cured epoxy or in the preparation of polyurethane.

19. The method of claim 17, further comprising using the recovered DMP as a curing agent in the preparation of cured epoxy or in the preparation of polyurethane.

20. The method of claim 1, wherein the reaction pressure is about 0.5 to 4 MPa.

* * * * *

UNITED STATES PATENT AND TRADEMARK OFFICE
CERTIFICATE OF CORRECTION

PATENT NO. : 10,696,815 B2
APPLICATION NO. : 16/004169
DATED : June 30, 2020
INVENTOR(S) : Jinwen Zhang et al.

Page 1 of 1

It is certified that error appears in the above-identified patent and that said Letters Patent is hereby corrected as shown below:

In the Claims

Column 12, Claim 12, Line 67: "$Ni^{3+}$, $Sn^{2+}$, $Sn^{4+}$, $Pb^{2+}$, and $Pb^{4+}$ ions, and" should read -- $Co^{3+}$, $Ni^{2+}$, $Ni^{3+}$, $Sn^{2+}$, $Sn^{4+}$, $Pb^{2+}$, and $Pb^{4+}$ ions, and --

Signed and Sealed this
Sixth Day of October, 2020

Andrei Iancu
*Director of the United States Patent and Trademark Office*